(12) United States Patent
Millhouse et al.

(10) Patent No.: US 10,515,395 B2
(45) Date of Patent: Dec. 24, 2019

(54) SYSTEMS AND METHODS FOR REIMBURSING CARRIERS FOR SUPPLIER-ASSOCIATED DELAYS

(71) Applicant: Walmart Apollo, LLC, Bentonville, AR (US)

(72) Inventors: Andrew B. Millhouse, Gilbert, AZ (US); Timothy J. Burleson, Bentonville, AR (US); John S. Meredith, Bentonville, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 0 days.

(21) Appl. No.: 15/883,616

(22) Filed: Jan. 30, 2018

(65) Prior Publication Data

US 2018/0247350 A1    Aug. 30, 2018

Related U.S. Application Data

(60) Provisional application No. 62/464,513, filed on Feb. 28, 2017.

(51) Int. Cl.
| | |
|---|---|
| *G06Q 30/04* | (2012.01) |
| *G06F 3/0482* | (2013.01) |
| *H04L 12/58* | (2006.01) |
| *G06F 17/24* | (2006.01) |
| *G06F 3/0484* | (2013.01) |

(52) U.S. Cl.
CPC .......... *G06Q 30/04* (2013.01); *G06F 3/0482* (2013.01); *G06F 3/04842* (2013.01); *G06F 17/243* (2013.01); *G06F 17/248* (2013.01); *H04L 51/20* (2013.01); *H04L 51/22* (2013.01); *H04L 51/24* (2013.01)

(58) Field of Classification Search
None
See application file for complete search history.

(56) References Cited

U.S. PATENT DOCUMENTS

| | | |
|---|---|---|
| 6,571,149 B1 | 5/2003 | Hahn-Carlson |
| 8,812,381 B2 | 8/2014 | Lemme |
| 2002/0184084 A1 | 12/2002 | Lidow |
| 2003/0063111 A1 | 4/2003 | MacLean |
| 2005/0209913 A1 | 9/2005 | Wied |

(Continued)

OTHER PUBLICATIONS

"CONEQ Container Control System"; http://www.plipdeco.com/main/index.php?page=coneq-demurrage-management-system; 2015; 2 pgs.

(Continued)

*Primary Examiner* — Allen C Chein
*Assistant Examiner* — Denisse Y Ortiz Roman
(74) *Attorney, Agent, or Firm* — Fitch, Even, Tabin & Flannery, LLP

(57) ABSTRACT

In some embodiments, methods and systems are provided that provide for delivering products to customers while analyzing and satisfying product-associated and/or delivery location-associated restrictions. The delivery attempt of the products is commenced after the product-associated restrictions are determined to be satisfied. The delivery of the product or products to the customer or an authorized person is authorized after the delivery location-associated restrictions are determined to be satisfied.

8 Claims, 8 Drawing Sheets

(56) References Cited

U.S. PATENT DOCUMENTS

| | | |
|---|---|---|
| 2007/0083410 A1 | 4/2007 | Hanna |
| 2009/0187482 A1 | 7/2009 | Blount |
| 2010/0318469 A1* | 12/2010 | Burbage ................ G06Q 10/10 705/80 |
| 2015/0066752 A1* | 3/2015 | Phillips .............. G06Q 10/0837 705/40 |
| 2015/0347984 A1 | 12/2015 | Sheykh-Zade |

OTHER PUBLICATIONS

"GE Transportation Announces Demurrage Management Software Enhancements for Rail Shippers"; http://www.getransportation.com/news/ge-transportation-announces-demurrage-managemen . . . ; Nov. 12, 2014; 3 pgs.

"Say Hello to Voyager the Ulitmate Demurrage Solution"; http://www.haugensoftware.com/voyager/; 2015; 4 pgs.

PCT; App. No. PCT/US2018/015654; International Search Report and Written Opinion dated May 17, 2018.

* cited by examiner

Detentions > Add Detention

For help with this form, please e-mail the   Detentions Team

WM Load Number *   ⌐326                           PO Number   ⌐326

SCAC            ⌐326                              Carrier *   Make a Selection...

● Detention Business Location   ⌐327

Location Type *   [   ▼]
                            ⌐327
Supplier Location *  [   ▼]

Supplier Facility Name

Supplier Address

● Appointment

☑ Open Window Appointment   ⌐328                                      ⌐328

Appointment Beginning        Appointment Ending Date/
Date/ Time                   Time ● Arrival/ Completion   ⌐328

Arrival Date/ Time *   [         ]
                                      ⌐328
Completion Date/ Time *   [         ]

● Carrier Information

| | | |
|---|---|---|
| Carrier Reference Number * | [_____] | 426 |
| Tractor Number * | [____] | 426 |
| Trailer Number * | [____] | 426 |
| Driver Name * | [_____] | 426 |
| Carrier Contact Name * | [_____] | 426 |
| Carrier Phone Number * | [_____] ext. [__] | 426 |
| Carrier E-mail * | [_____] | 426 |

Note: This e-mail address will be used for Detention Status Notifications.

Bill of Lading * [_____] 429
[Browse...]

● Comments

Comments [_____] 426

SYSTEMS AND METHODS FOR REIMBURSING CARRIERS FOR SUPPLIER-ASSOCIATED DELAYS

CROSS-REFERENCE TO RELATED APPLICATIONS

This application claims the benefit of U.S. Provisional Application No. 62/464,513, filed Feb. 28, 2017, which is incorporated herein by reference in its entirety.

TECHNICAL FIELD

This invention relates generally to managing carrier delays during load hauling and, in particular, to processing detention reimbursement requests submitted by the carriers.

BACKGROUND

Major retailers utilize carriers to transport products between various facilities of the retailers. The carriers typically operate on a schedule and there is an expectation that a carrier spend no more than a predetermined amount of time (e.g., 1, 2, or 3 hours) at a supplier facility picking up a load. Generally, when a carrier hauling a load for a retailer is required to wait at a supplier for longer than a predetermined period of time (e.g., 1, 2, 3, or more hours after arrival), the carrier is eligible to file for a detention (i.e., delay) reimbursement request with the retailer in order to get reimbursed for the supplier-associated delay that the carrier was subjected to.

Conventional systems for processing detention reimbursement requests rely on facsimile and/or electronic mail. For example, a supplier typically submits a detention reimbursement request by faxing the retailer, which then notifies the supplier by facsimile that a detention reimbursement request against the supplier has been submitted by a carrier. The supplier then responds by facsimile to the retailer to dispute and/or otherwise comment regarding the carrier's detention reimbursement request, and the retailer then notifies the carrier and the supplier by facsimile regarding the resolution (i.e., credited amount to the retailer and invoiced amount to the supplier) of the carrier's detention reimbursement request. As a result, such conventional systems are complicated due to the many manual steps involved and are subject to human error.

BRIEF DESCRIPTION OF THE DRAWINGS

Disclosed herein are embodiments of systems, apparatuses, methods, and systems pertaining to facilitating reimbursement of carriers for supplier-associated delays during transportation of products by the carriers. This description includes drawings, wherein:

FIG. 3 is a screen shot of an exemplary first graphical interface of the system of FIG. 1 in accordance with some embodiments;

FIG. 4 is a screen shot of an exemplary first graphical interface of the system of FIG. 1 in accordance with some embodiments;

Figure 1:
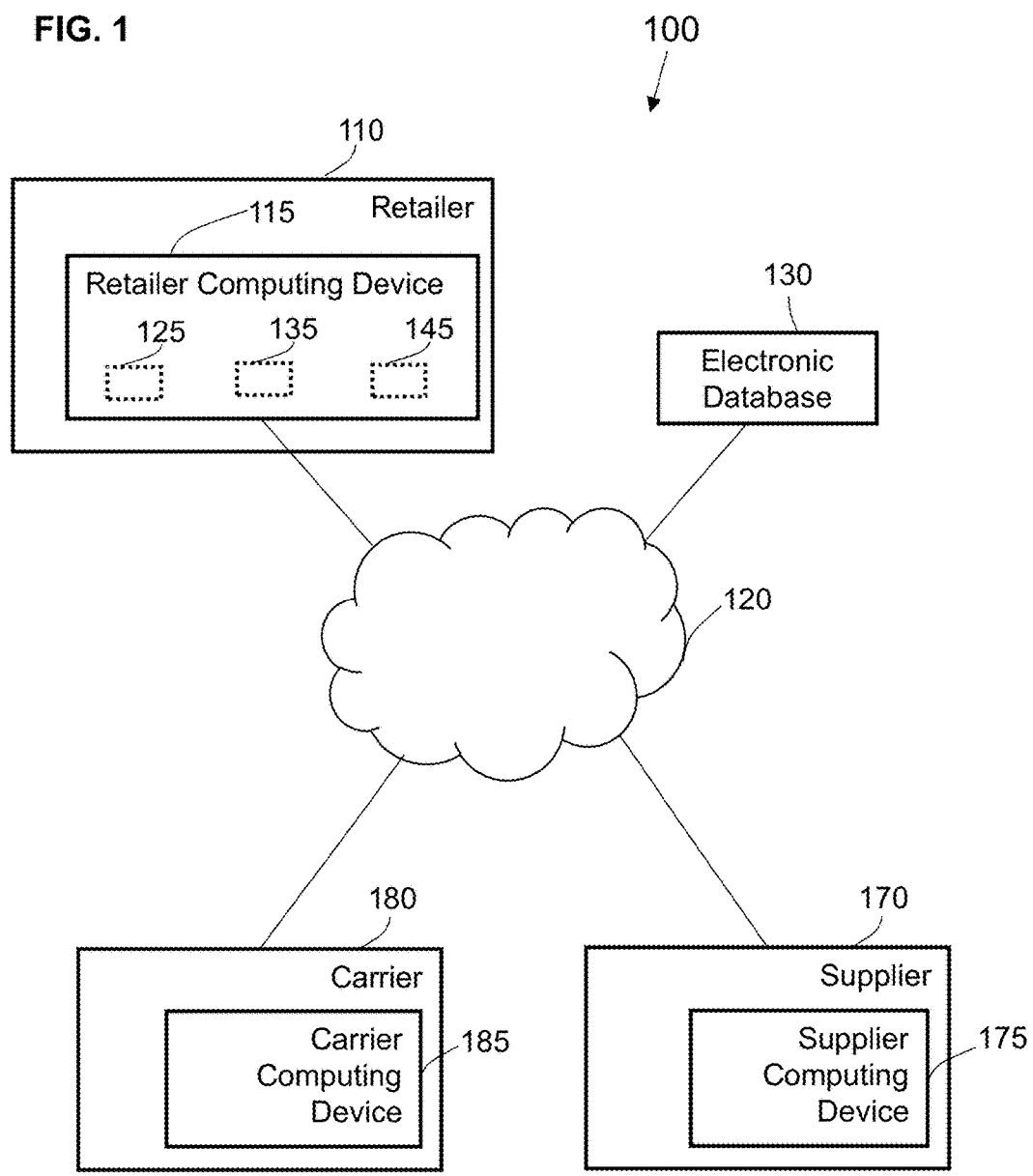
FIG. 1 is a diagram of a system of facilitating reimbursement of carriers for supplier-associated delays during transportation of products by the carriers in accordance with some embodiments.

Elements in the figures are illustrated for simplicity and clarity and have not been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

The following description is not to be taken in a limiting sense, but is made merely for the purpose of describing the general principles of exemplary embodiments. Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Generally speaking, pursuant to various embodiments, systems and methods are provided for facilitating reimbursement of carriers for supplier-associated delays during transportation of products by the carriers.

In some embodiments, a system for facilitating reimbursement of carriers for supplier-associated delays during transportation of products by the carriers includes a retailer computing device including a processor-based control circuit and configured for communication with computing devices of the carriers over a communication network and an electronic database in communication with the retailer computing device and the computing devices of the carriers over the communication network. The retailer computing device is configured to: generate a first graphical interface accessible on the retailer computing device by the carriers via their respective computing devices and configured to permit the carriers, via their respective computing devices, to submit reimbursement requests based on supplier-associated delays experienced by the carriers; generate a second graphical interface including a listing of the reimbursement requests submitted by the carriers via the first graphical interface; permit an operator of the retailer computing device to browse through the listing of the reimbursement requests in the second graphical interface and to select from the listing a reimbursement request submitted by a carrier against a supplier to be forwarded to the supplier for review; transmit, over the communication network to a computing device of the supplier, an alert based on the reimbursement request selected by the operator from the listing to be forwarded to a supplier for review; receive a transmission over the communication network from the computing device of the supplier indicating a response of the supplier to the reimbursement request submitted by the carrier against the supplier; calculate, via the processor-based control circuit and based on the reimbursement request submitted by the carrier and based on the response of the supplier, a reimbursement amount owed to the carrier; and transmit, to at least one of the computing device of the carrier and the computing device of the supplier, a notification indicating whether the reimbursement request has been approved by the operator of the retailer computing device.

In some embodiments, a method for facilitating reimbursement of carriers for supplier-associated delays during transportation of products by the carriers includes: providing a retailer computing device including a processor-based control circuit and configured for communication with computing devices of the carriers over a communication network; providing an electronic database in communication with the retailer computing device and the computing devices of the carriers over the communication network; providing a first graphical interface accessible on the retailer computing device by the carriers via their respective computing devices and configured to permit the carriers, via their respective computing devices, to submit reimbursement requests based on supplier-associated delays experienced by the carriers; generating a second graphical interface including a listing of the reimbursement requests submitted by the carriers via the first graphical interface; permitting an operator of the retailer computing device to browse through the listing of the reimbursement requests in the second graphical interface and to select from the listing a reimbursement request submitted by a carrier against a supplier to be forwarded to the supplier for review; transmitting, from the retailer computing device over the communication network to a computing device of the supplier, an alert based on the reimbursement request selected by the operator from the listing to be forwarded to a supplier for review; receiving, at the retailer computing device, a transmission over the communication network from the computing device of the supplier indicating a response of the supplier to the reimbursement request submitted by the carrier against the supplier; calculating, via the processor-based control circuit and based on the reimbursement request submitted by the carrier and based on the response of the supplier, a reimbursement amount owed to the carrier; and transmitting, from the retailer computing device to at least one of the computing device of the carrier and the computing device of the supplier, a notification indicating whether the reimbursement request has been approved by the operator of the retailer computing device.

FIG. 1 shows an embodiment of a system 100 for facilitating reimbursement of carriers 180 for supplier-associated delays during transportation of products by the carriers 180 for retailers 110. A retailer 110 will be understood to mean any entity operating as a brick-and-mortar physical store and/or a website accessible, for example, via the internet or another network, by way of which products may be ordered by customers. A supplier 170 will be understood to mean any entity that manufactures, distributes, and/or sorts products that are delivered by carriers 180 to facilities of the retailer 110. A customer will be understood as an individual or a business entity. Exemplary products that may be transported by carriers 180 may include, but are not limited to, general-purpose customer goods, as well as consumable products, such as medications, food items, and dietary supplements.

The exemplary system 100 depicted in FIG. 1 includes a retailer computing device 115, which may be implemented as one computer/server at one facility of the retailer 110, or as multiple interconnected computers/servers stored at multiple facilities operated by the retailer 110, or for the retailer 110. In some embodiments, the retailer computing device 115 is a stationary or portable electronic device, for example, a desktop computer, a laptop computer, a tablet, a mobile phone, or any other electronic device including a processor-based control circuit (i.e., control unit). In the embodiment of FIG. 1, the retailer computing device 115 is configured for data entry and processing as well as for communication with other devices of system 100 via a network 120.

The network 120 may be a wide-area network (WAN), a local area network (LAN), a personal area network (PAN), a wireless local area network (WLAN), or any other internet or intranet network, or combinations of such networks. Generally, communication between various electronic devices of system 100 may take place over hard-wired, wireless, cellular, Wi-Fi or Bluetooth networked components or the like. In some embodiments, one or more electronic devices of system 100 may include cloud-based features, such as cloud-based memory storage. In some embodiments, as will be described below, the retailer computing device 115 is configured to access an electronic database 130 and/or communicate with a carrier computing device 185 and/or communicate with a supplier computing device 175 via the network 120 to facilitate the processing of detention reimbursement requests by carriers 180 against suppliers 170.

In the embodiment of FIG. 1, the retailer computing device 115 is coupled to an electronic database 130. In some embodiments, the electronic database 130 may be configured to store information associated with the products being transported by the carriers 180 between facilities of the suppliers 170 and facilities of the retailer 110. Generally, the electronic database 130 stores electronic information including but not limited to: information associated with the carriers 180 and detention reimbursement requests submitted by the carriers 180, information associated with the suppliers 170 and detention reimbursement requests submitted against the suppliers 170, and information associated with the retailer 110 and detention reimbursement processing by the retailer 110. The electronic database 130 may be stored, for example, on non-volatile storage media (e.g., a hard drive, flash drive, or removable optical disk) internal or external to the retailer computing device 115, or internal or external to computing devices separate and distinct from the retailer computing device 115. It will be appreciated that the electronic database 130 may likewise be cloud-based. While the retailer computing device 115 is shown in FIG. 1 in communication with one electronic database (i.e., electronic database 130) over the network 120, it will be appreciated that the retailer computing device 115 may be coupled via the network 120 to one or more additional electronic databases.

In some embodiments, when a carrier 180 initially sets up an online account with the retailer 110, the system 100 (e.g., retailer computing device 115) is configured to permit the carrier 180 to generate a carrier profile including information of the carrier 180 (e.g., name, address, other identifying information (e.g., Standard Carrier Alpha Code (SCAS)), phone number, financial information (e.g., bank account information), and the like). In some embodiments, the information associated with the carriers 180 is stored in the electronic database 130 for subsequent retrieval by the retailer computing device 115 (e.g., in response to a detention reimbursement request by the carrier 180).

A carrier 180 may access the retailer computing device 115 over the network 120 via a carrier computing device 185, which may be a stationary, portable, and/or hand-held electronic device, for example, a desktop computer, a laptop computer, a tablet, a mobile phone, or any other electronic, processor-based device configured for data entry and communication with the retailer computing device 115. Similarly, a supplier 170 may access the retailer computing device 115 over the network 120 via a supplier computing device 175, which may be a stationary, portable, and/or hand-held electronic device, for example, a desktop computer, a laptop computer, a tablet, a mobile phone, or any other electronic, processor-based device configured for data entry and communication with the retailer computing device 115.

In some aspects, as the carrier 180 is connecting over the network 120 to the retailer computing device 115, the retailer computing device 115 may request a verification of the identity (e.g., username/password) of the carrier 180. The retailer computing device 115 may first verify the identity of the carrier 180 (e.g., by comparing the username/password data entered by the carrier 180 into the login interface against username/password data in the profile of the carrier 180 stored in the electronic database 130). The retailer computing device 115 may then associate the profile of the carrier 180 with the identity of the carrier 180, retrieve carrier account information stored in the profile, and send the carrier account information retrieved from the profile to the retailer computing device 115. Similarly, in some aspects, as the supplier 170 is connecting over the network 120 to the retailer computing device 115, the retailer computing device 115 may request a verification of the identity (e.g., username/password) of the supplier 170. The retailer computing device 115 may first verify the identity of the supplier 170 (e.g., by comparing the username/password data entered by the supplier 170 into the login interface against username/password data in the profile of the supplier 170 stored in the electronic database 130). The retailer computing device 115 may then associate the profile of the supplier 170 with the identity of the supplier 170, retrieve supplier account information stored in the profile, and send the supplier account information retrieved from the profile to the retailer computing device 115.

In some aspects, the retailer computing device 115 is configured to enable the carriers 180 to enter electronic data pertaining to their detention reimbursement requests based on supplier-associated delays experienced by the carriers 180 by generating an internet-based form (i.e., first graphical interface 125) accessible by the carriers 180 via carrier computing devices 185 that are logged in to the retailer computing device 115. In some embodiments, the graphical interface 125 is configured to permit the carriers 180 to submit their detention reimbursement requests without having to log in to the retailer computing device 115.

A portion of an exemplary graphical interface 325 is illustrated in FIG. 3 and another portion of an exemplary first graphical interface 425 is illustrated in FIG. 4. In some aspects, the first graphical interface 325, 425 includes one or more text input fields 326, 426, drop-down menu fields 327, 427, and graphical button fields 328, 428 that permit a carrier 180 to enter electronic data relating to a detention reimbursement request submitted by the carrier 180 with respect to one or more suppliers 170. In some embodiments, instead of being an internet-based form having a defined uniform resource locator (URL) address and accessible via an internet browser of the carrier computing device 185, the first graphical interface 125 is generated within a mobile application (app) installed on the carrier computing device 185 and configured to display various above-described text input fields, menu options, and/or notifications for the carrier 180.

In some embodiments, when submitting a new detention request via the retailer computing device 115 using the first graphical interface 125, the carrier 180 can specify various parameters relating to the detention reimbursement request. For example, with reference to FIG. 3, the carrier 180 may use the carrier computing device 185 to enter, via one or more of the above-described editable fields of the exemplary graphical interface 325, electronic data including but not limited to: load identifying information ("Load Number"); purchase order identifying information ("PO Number"); Standard Carrier Alpha Code ("SCAC"); type of carrier ("Carrier"); type of location ("Location Type"); location of the supplier 170 ("Supplier Location"); type of appointment with supplier 170 ("Open Window Appointment;" "Appointment Beginning Date/Time;" and "Appointment Ending Date/Time"); date and time of arrival at supplier 170 ("Arrival Data/Time"), as well as date and time of completion of load pick up/drop off at supplier 170 ("Completion Date/Time").

By the same token, with reference to FIG. 4, the carrier 180 may use the carrier computing device 185 to enter, via one or more of the above-described editable fields of the exemplary graphical interface 425, electronic data including but not limited to: reference number of the carrier 180 ("Carrier Reference Number'); number of a tractor ("Tractor Number") or trailer ("Trailer Number"); name of a driver of the carrier 180 ("Driver Name"); contact name ("Carrier Contact Name"), phone number ("Carrier Phone Number"), and email ("Carrier E-mail") of the carrier 180; bill of lading ("Bill of Lading," including a clickable button 429 that enables the carrier 180 to upload an electronic copy of the bill of lading); and comments regarding the detention reimbursement submission ("Comments").

Figure 2:
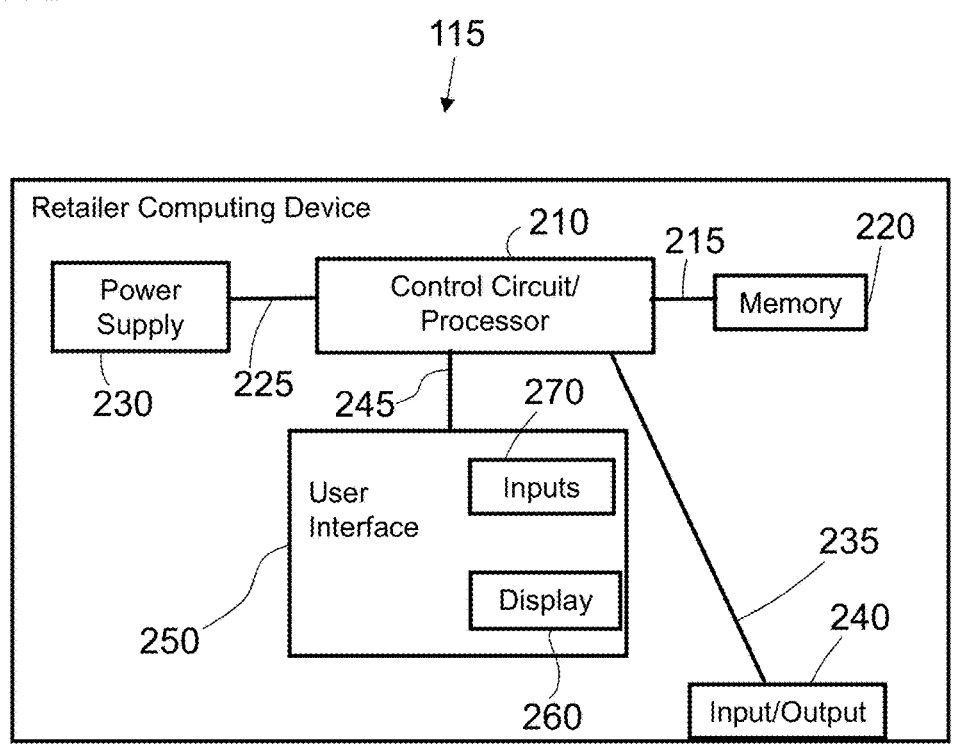
FIG. 2 is a functional diagram of an exemplary retailer computing device usable with the system of FIG. 1 in accordance with some embodiments.

With reference to FIG. 2, an exemplary retailer computing device 115 configured for use with the systems and methods described herein may include a control circuit 210 including a processor (for example, a microprocessor or a microcontroller) electrically coupled via a connection 215 to a memory 220 and via a connection 225 to a power supply 230. The control unit 210 can comprise a fixed-purpose hard-wired platform or can comprise a partially or wholly programmable platform, such as a microcontroller, an application specification integrated circuit, a field programmable gate array, and so on. These architectural options are well known and understood in the art and require no further description here.

The control unit 210 of the retailer computing device 115 can be configured (for example, by using corresponding programming stored in the memory 220 as will be well understood by those skilled in the art) to carry out one or more of the steps, actions, and/or functions described herein. In some embodiments, the memory 220 may be integral to the processor-based control unit 210 or can be physically discrete (in whole or in part) from the control unit 210 and is configured non-transitorily store the computer instructions that, when executed by the control unit 210, cause the control unit 210 to behave as described herein. (As used herein, this reference to "non-transitorily" will be understood to refer to a non-ephemeral state for the stored contents (and hence excludes when the stored contents merely constitute signals or waves) rather than volatility of the storage media itself and hence includes both non-volatile memory (such as read-only memory (ROM)) as well as volatile memory (such as an erasable programmable read-only memory (EPROM))). Accordingly, the memory and/or the control unit may be referred to as a non-transitory medium or non-transitory computer readable medium.

The control unit 210 of the retailer computing device 115 is also electrically coupled via a connection 235 to an input/output 240 that can receive signals from electronic devices in communication over the network 120 with the retailer computing device 115 (e.g., data from the electronic database 130 and/or supplier computing device 175 and/or carrier computing device 185 relating to a detention reimbursement request submitted by a carrier 180; or from any other source that can communicate with the retailer computing device 115 via a wired or wireless connection). The input/output 240 of the retailer computing device 115 can also send signals to electronic devices in communication over the network 120 with the retailer computing device 115 (e.g., data to the electronic database 130 and/or supplier computing device 175 and/or carrier computing device 185 relating to a detention reimbursement request submitted by a carrier 180; or to any other source that can communicate with the retailer computing device 115 via a wired or wireless connection).

In the embodiment shown in FIG. 2, the processor-based control unit 210 of the retailer computing device 115 is electrically coupled via a connection 245 to a user interface 250, which may include a visual display or display screen 260 (e.g., LED screen) and/or button input 270 that provide the user interface 250 with the ability to permit an operator of the retailer computing device 115 to manually control the retailer computing device 115 by inputting commands via touch-screen and/or button operation and/or voice commands to, for example, to approve or deny a detention reimbursement request submitted by a carrier 180 against a supplier 170. It will be appreciated that the performance of such functions by the processor-based control unit 210 of the retailer computing device 115 is not dependent on a human operator, and that the control unit 210 may be programmed to perform such functions without a human operator.

In some embodiments, the display screen 260 of retailer computing device 115 is configured to display various graphical interface-based menus, options, and/or alerts that may be transmitted to the retailer computing device 115 and displayed on the display screen 260 in connection with various aspects of the detention reimbursement request submitted by the carrier 180. The inputs 270 of the retailer computing device 115 may be configured to permit an operator to navigate through the on-screen menus on the retailer computing device 115 and, for example, mark a detention reimbursement request as valid or invalid and/or approve or deny a detention reimbursement request and/or send a notification to a supplier 170 that a detention reimbursement request has been submitted against that supplier by a carrier 180. It will be appreciated that the display screen 260 may be configured as both a display screen and an input 270 (e.g., a touch-screen that permits an operator to press on the display screen 260 to enter text and/or execute commands.)

As discussed above, in some aspects, the control circuit 210 of the retailer computing device 115 is programmed to generate a first graphical interface 125 accessible on the retailer computing device 115 by the carrier 180 via the carrier computing device 185. As discussed above, this graphical interface 135 is configured (e.g., by including text input fields 326, 426, and/or drop-down menus 327, 427, and/or graphical buttons 328 and/or radial buttons) to permit the carrier 180, via the carrier computing device 185, to submit reimbursement requests based on supplier-associated delays experienced by the carriers 180. A screen shot of a portion of the first graphical interface 525 is shown in FIG. 5, where an operator of the retailer computing device 115 can click on a drop-down menu 528 and select "Browse choices" to bring up a list of suppliers 170 that have detention reimbursement requests submitted against them.

Figure 5:
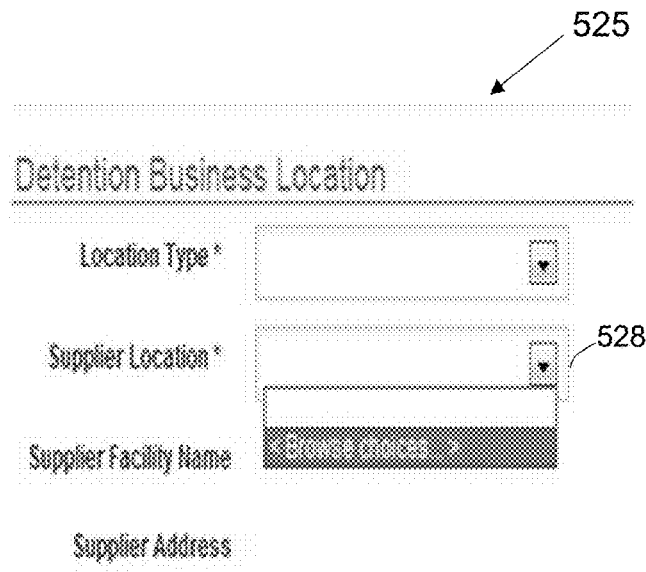
FIG. 5 is a screen shot of an exemplary graphical interface of the system of FIG. 1 in accordance with some embodiments.
Figure 6:
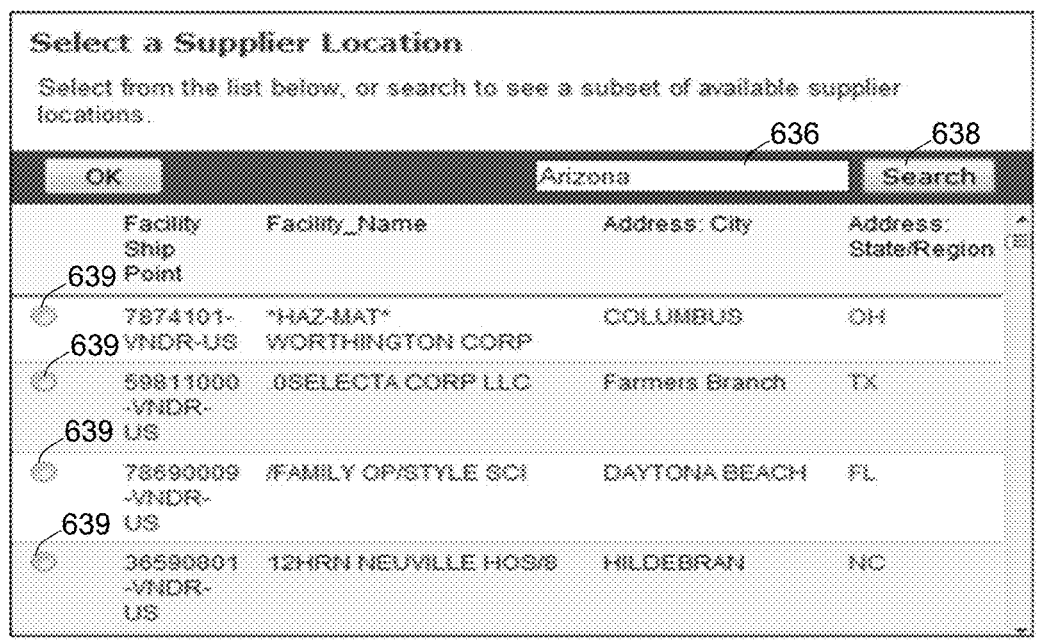
FIG. 6 is a screen shot of an exemplary second graphical interface of the system of FIG. 1 in accordance with some embodiments.

In some embodiments, after a detention reimbursement request has been submitted by a carrier 180 against a supplier 170, and after the operator clicks "Browse choices" within the exemplary first graphical interface 525 shown in FIG. 5, the control circuit 210 of the retailer computing device 115 is programmed to generate a second graphical interface 635 as shown in FIG. 6 (annotated with reference numeral 135 in FIG. 1), which includes a listing of suppliers 170 having reimbursement requests submitted by the carriers 180 against them via the first graphical interface 125. The exemplary second graphical interface 635 shown in FIG. 6 is configured to permit an operator (e.g., employee or manager of the retailer 110) of the retailer computing device 115 to browse through a listing of the detention reimbursement requests submitted by carriers 180 against suppliers 170, and to select from the listing (e.g., by clicking on an appropriate radial button 639) a detention reimbursement request to be forwarded to the supplier 170 for review.

A portion of the second graphical interface 635 including a hypothetical listing of hypothetical suppliers 170 is shown by way of example only in FIG. 6. While the second graphical interface 635 is displayed on the retailer computing device 115, an operator of the retailer computing device 115 is permitted to either select one of the displayed suppliers 170 by clicking on an appropriate radial button 639, or to enter a search query into the text field 636 (e.g., supplier facility ship point identifier, supplier facility name, supplier facility address, supplier facility city, and/or supplier facility state), and then click the "Search" graphical button 638 in order to search for the query (e.g., the state "Arizona" shown in FIG. 6).

Figures 7, 8:
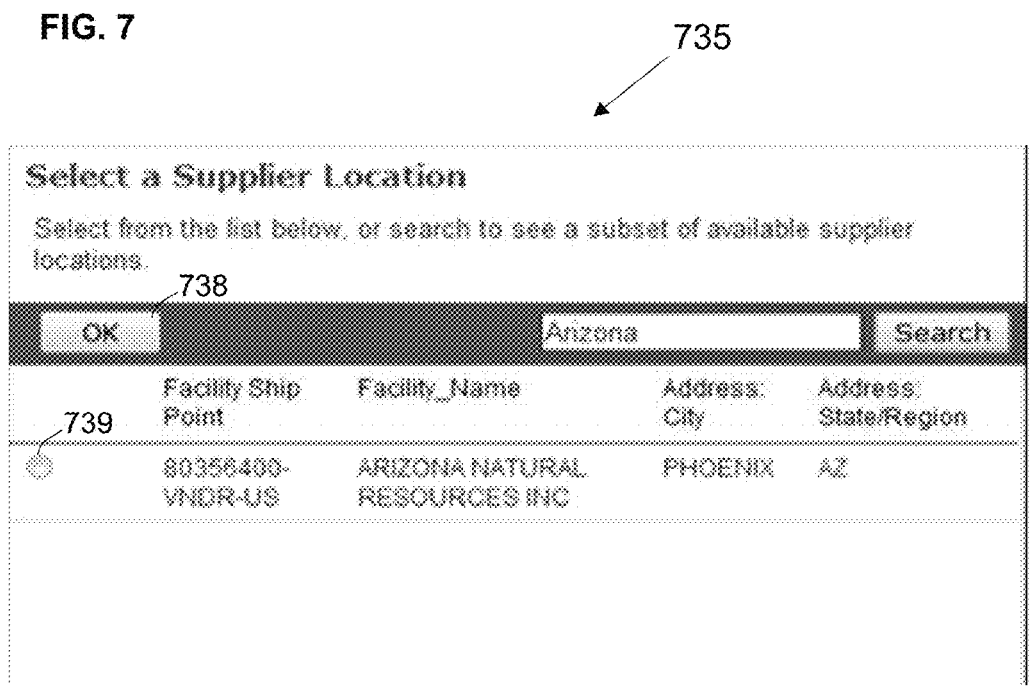
FIG. 7 is a screen shot of an exemplary second graphical interface of the system of FIG. 1 in accordance with some embodiments.
FIG. 8 is a screen shot of an exemplary first graphical interface of the system of FIG. 1 in accordance with some embodiments.

After the operator of the retailer computing device 115 clicks the "Search" button 638 within the second graphical interface 635 shown in FIG. 6, the exemplary hypothetical result of this search is generated in the second graphical interface 735 shown in FIG. 7. In the embodiment illustrated in FIG. 7, the second graphical interface 735 includes a radial button 739 next to the supplier facility in order to permit the operator of the retailer computing device 115 to select this supplier facility, after which the operator can click the "OK" graphical push button 738 in order to cause the retailer computing device 115 to populate the "Supplier Location" drop-down menu field 827, as well as the "Supplier Facility Name" text input field 826 and the "Supplier Address" text input field 826 in the first graphical interface 825 shown in FIG. 8 (and which was originally shown in its unpopulated state (fields labeled 327) in FIG. 3).

The second graphical interface 735, in some configurations, causes the retailer computing device 115 to transmit (e.g., over the network 120) to a computing device 175 of the supplier 170, an electronic notification or alert based on the reimbursement request selected by the operator of the retailer computing device 115 from the listing of reimbursement requests to be forwarded to the supplier 170 for review. In some embodiments, the electronic notifications sent by the retailer computing device 115 over the network 120 to the supplier computing device 175 includes but is not limited to short message service (SMS) messages, electronic mail (e-mail) messages, instant messenger messages, voice mail messages, and/or push notifications. By the same token, the retailer computing device 115 is configured to receive a transmission over the network 120 from the supplier computing device 175 (e.g., an acknowledgment of the original notification sent to the supplier computing device 175 or a response of the supplier 170 to the reimbursement request submitted by the carrier 180 against the supplier 170).

In some embodiments, the control circuit 210 of the retailer computing device 115 is programmed to analyze the electronic data submitted with the detention reimbursement request submitted by the carrier 180 and the electronic data submitted by the supplier 170 in response to the submitted detention reimbursement request in order to determine whether the detention reimbursement request of the carrier 180 should be granted or denied, as well as to calculate, for a granted reimbursement request, a reimbursement amount owed to the carrier 180. In some aspects, the control circuit 210 of the retailer computing device 115 can be programmed to determine if the detention reimbursement request by the carrier 180 was sent within a predetermined acceptable time frame after the detention event occurred. The predetermined acceptable time frame within which a detention reimbursement request would be considered timely by the control unit 210 can be set, for example, at 30 days, 21 days, 15 days, 14 days, 10 days, 7 days, 5 days, 3 days, etc. In one aspect, after the control circuit 210 determines that a detention reimbursement request by the carrier 160 is submitted after the predetermined acceptable time frame (e.g., 14 days) from the detention event has elapsed, the control circuit 210 is programmed to transmit a response to the carrier 160 indicating (e.g., via an appropriate reason code) that the request has been denied because it was not timely submitted by the carrier 160, and to send a signal to the electronic database 130 to record this denial for future reference.

In one exemplary embodiment illustrated in FIG. 10, the control circuit 210 of the retailer computing device 115 is programmed such that, after the control circuit 210 determines that the reimbursement request by the carrier 160 was submitted within the predetermined acceptable period of time (e.g., 14 days), the control circuit 210 calculates the detention cost via decision tree-based processing as follows. First, the control unit 210 determines whether there was an appointment time set for the carrier 180 with the supplier 170 (step 1010). If the control unit 210 determines that there was no appointment, the control unit 210 calculates costs based on the arrival time and departure time of the carrier 180 to/from the supplier 170 (step 1015), as will be discussed in more detail below. If the carrier 180 did have an appointment with the supplier, the control unit 210 determines whether the driver of the carrier 160 was late (step 1020). As discussed above, the arrival time and departure time of the carrier 180 can be entered by the carrier 160 (e.g., via the fields 328 in FIG. 3) when submitting the detention reimbursement request, and can be retrieved by the control circuit 210 from the electronic database 130 to determine whether the carrier 180 was late for the appointment with the supplier 170, and to calculate detention costs if the control circuit 210 determines that the carrier 180 did not have an appointment.

Figure 10:
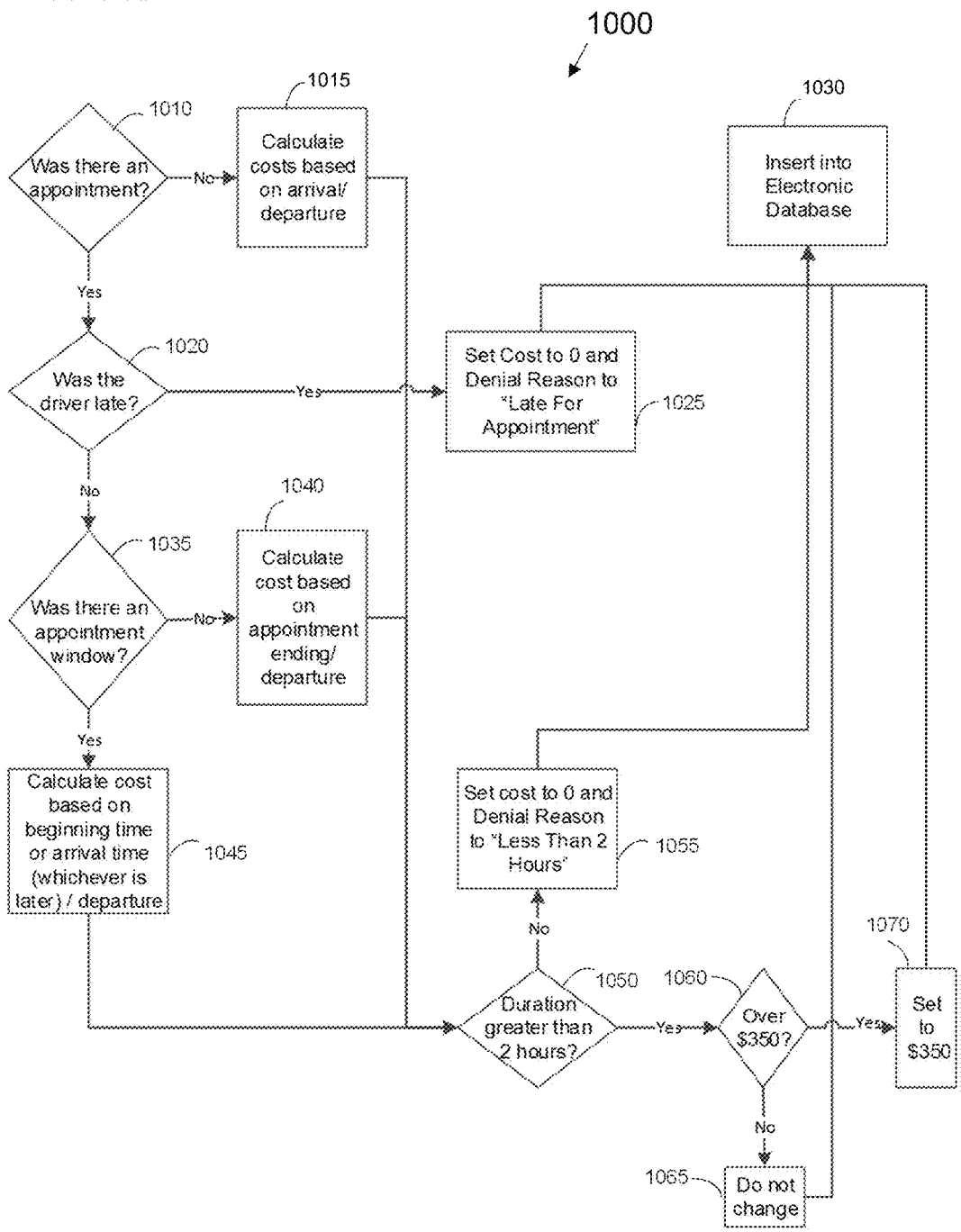
FIG. 10 is a flow chart diagram of a process of facilitating reimbursement of carriers for supplier-associated delays during transportation of products by the carriers in accordance with some embodiments.

In the embodiment illustrated in FIG. 10, if the control unit 210 determines, (e.g., after obtaining information indicating the appointment time and arrival time of the carrier 180 from the electronic database 130), that the driver of the carrier 160 was late to the appointment, the control unit 210 sets reimbursement costs to 0, and denial reason to "Late for Appointment" (step 1025). This denial decision by the control unit 210 is then transmitted (e.g., with an appropriate reason code) from the retailer computing device 115 to the electronic database 130 for recording and future reference (step 1030). In addition, the denial decision can be transmitted by the control unit 210 to the carrier computing device 185, indicating (e.g., via an appropriate reason code) that the detention reimbursement request has been denied.

In the exemplary process 1000 of FIG. 10, if the control unit 210 determines that the carrier 160 was not late to the appointment, the control unit 210 is programmed to determine (e.g., after obtaining information pertaining to presence or absence of an appointment window from the electronic database 130) whether the carrier 180 had a specific appointment window for arriving to and departing from the supplier 170 (step 1035). As can be seen in FIG. 10, if the control unit 210 determines that there was no appointment window reflected in the electronic database 130, the control unit 210 is programmed to calculate cost based on appointment ending time/departure time of the carrier 180 (step 1040). Conversely, if the control unit 210 determines that there was an appointment window reflected in the electronic database 130, the control unit 210 is programmed to calculate cost based on beginning time or arrival time (whichever is later) of the carrier 180 to the supplier 170 and the departure time of the carrier 180 from the supplier 170 (step 1045).

In some aspects, when calculating detention cost, the control unit 210 can be programmed to set detention cost to 0 when the detention time is below a predetermined threshold (e.g., 1 hour, 2 hours, 3 hours, 4 hours, 5 hours, 6 hours, etc.). In the embodiment illustrated in FIG. 10, the control unit 210 is preset to set cost to 0 if the detention time is below 2 hours. As such, after the control unit 210 determines whether the duration of the detention of the carrier 180 at the supplier 170 is greater than 2 hours (step 1050) and the answer is "No," the control unit 210 sets reimbursement costs to 0 and denial reason to "Less Than 2 Hours" (step 1055). This denial decision by the control unit 210 is then transmitted (e.g., with an appropriate reason code) from the retailer computing device 115 to the electronic database 130 for recording and future reference (step 1030). In addition, the denial decision can be transmitted by the control unit 210 to the carrier computing device 185, indicating (e.g., via an appropriate reason code) that the detention reimbursement request has been denied.

In some aspects, when calculating detention cost, the control unit 210 can be programmed to not change the calculated detention cost value if the value is below a certain preset threshold cost value (e.g., $100, $200, $300, $400, $500, $750, $1000, etc.) and to set the calculated detention cost value to the preset threshold cost value when the calculated detention cost value is above the preset threshold cost value. In the embodiment illustrated in FIG. 10, the control unit 210 is programmed with a present threshold cost value of $350. As such, after the control unit 210 determines in step 1050 that the duration of the detention of the carrier 180 at the supplier 170 is greater than 2 hours, the control unit 210 determines whether the calculated detention cost is over $350 (i.e., the preset threshold cost value) (step 1060). As shown in FIG. 10, if the control unit 210 determines that the calculated detention cost value is not over $350, then the control unit is programmed not to change the calculated detention cost value (step 1665), and to transmit this detention cost value to the electronic database 130 for recording and future reference (step 1030). Conversely, if the control unit 210 determines that the calculated detention cost value is over $350, then the control unit is programmed to adjust the calculated detention cost value to the preset threshold cost value of $350 (step 1070), and to transmit this adjusted detention cost value to the electronic database 130 for recording and future reference (step 1030).

In some aspects, the control circuit 210 may be programmed to calculate the reimbursement amount based on various factors including, but not limited to a predetermined flat rate associated with a given carrier 180 and/or a monetary rate (e.g., $1, $5, $10, $20, $50, $100, or more) per unit of time (e.g., 1 minute, 30 minutes, 1 hour, or more) that the carrier 180 is delayed at a facility of a supplier 170. In one aspect, after the control circuit 210 of the retailer computing device 115 calculates the reimbursement amount owed to the carrier 180, the control circuit 210 of the retailer computing device 115 is programmed to transmit to the carrier computing device 185 and/or supplier computing device 175, an electronic notification or alert indicating whether the reimbursement request submitted by the carrier 180 has been approved by the retailer computing device 115.

In some embodiments, the retailer computing device 115 is configured to display the reimbursement requests submitted by the carriers 180 (e.g., via the second graphical interface 635) to an operator of the retailer computing device 115 in order to permit the operator of the retailer computing device 115 to view and validate information submitted by the carriers 180 in their respective detention reimbursement requests. It will be appreciated that the control circuit 210 of the retailer computing device 115 can be programmed to automatically check and validate the detention reimbursement request without requiring any action by the operator of the retailer computing device 115. For example, in some aspects, the retailer computing device 115 is configured to display a first drop-down menu including a first list of template electronic mails for the operator of the retailer computing device 115 to select from, and after the operator selects a template electronic mail to be sent to the supplier, to transmit the operator-selected template electronic mail over the network 120 to the supplier computing device 175.

In some embodiments, after the template electronic mail notifying a supplier 170 that a detention reimbursement request against that supplier 170 has been submitted by a carrier 180 is transmitted from the retailer computing device 115 to the supplier computing device 175, and the supplier 170 does not respond to the template electronic mail within a predetermined interval of time (e.g., 6 hours, 12 hours, 24 hours, 48 hours, 1 week, etc.), the control circuit 210 of the retailer computing device 115 is configured to generate an alert notification indicating that the supplier 170 has not yet responded. After such an alert notification is generated, the retailer computing device 115 is configured to display a drop-down menu including a second list of follow up template electronic mails for the operator of the retailer computing device 115 to select from (e.g., by clicking a radial button next to the selected template follow up electronic mail). In one aspect, the template follow up electronic mail in the second list includes language indicating more urgency for the supplier 170 to respond to this electronic mail. After one of the template follow up electronic mails is selected from the second list by an operator of the retailer computing device 115, the retailer computing device 115 is configured to transmit, over the network 120, to the supplier computing device 175, the operator-selected template follow up electronic mail.

In some embodiments, the control circuit 210 of the retailer computing device 115 is configured to receive a first time stamp indicating a time when the carrier 180 arrived at a facility of the supplier 170 and a second time stamp indicating a time when the carrier 180 departed from the facility of the supplier 170. In one aspect, the first and second time stamps are received by the retailer computing device 115 over the network 120 from the supplier computing device 175. In another aspect, the first and second time stamps are obtained by the retailer computing device 115 over the network from the electronic database 130, which previously received the first and second time stamps over the network 120 from the supplier computing device 175. The exemplary retailer computing device 115 of FIG. 1 is configured to generate a third graphical interface 155 including a plurality of input fields configured to permit the operator of the retailer computing device 115 to input the first time stamp and/or the second stamp provided by the supplier 170 and/or obtained from the electronic database 140.

In some aspects, the second graphical interface 135 is configured to permit the operator of the retailer computing device 115 to approve a detention reimbursement request in the displayed listing of the reimbursement requests by clicking on a graphical element (e.g., radial button, check box, etc.) configured to execute approval or denial the detention reimbursement request. In one aspect, if the graphical element configured to execute approval of the detention reimbursement request is clicked by an operator of the retailer computing device 115, the retailer computing device 115 is configured to transmit an approval notification to the carrier computing device 185 over the network 120. In one aspect, such an approval notification indicates that the detention reimbursement request of the carrier 180 has been approved, and the amount of the reimbursement calculated by the retailer computing device 115 to be owed to the carrier 180. After the retailer computing device 115 transmits the approval notification to the carrier computing device 185, in some embodiments, the retailer computing device 115 is configured to transmit over the network 120 an approval notification to the supplier computing device 175 in order to inform the supplier 170 that the detention reimbursement request submitted by the carrier 180 against the supplier 170 has been approved, and to notify the supplier 170 of the amount billed to the supplier 170 to cover the reimbursement owed to the carrier 180.

Figure 9:
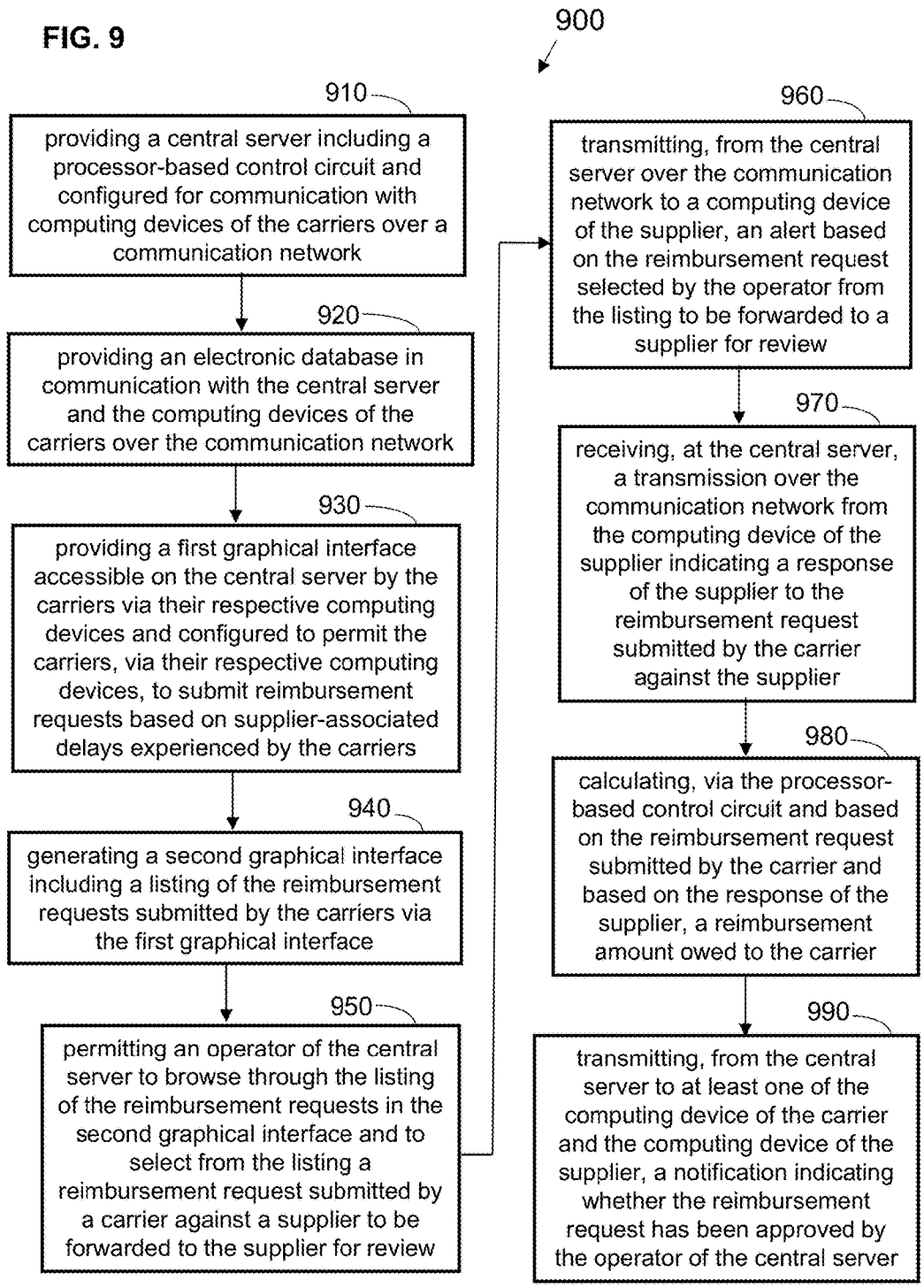
FIG. 9 is a flow chart diagram of a process of facilitating reimbursement of carriers for supplier-associated delays during transportation of products by the carriers in accordance with some embodiments.

FIG. 9 shows an embodiment of an exemplary method 900 of facilitating reimbursement of carriers 180 for supplier-associated delays during transportation of products by the carriers 180. The method 900 includes providing a retailer computing device 115 including a processor-based control circuit 210 and configured for communication with carrier computing devices 185 over a communication network 120 (step 910). In addition, the method 900 of FIG. 9 includes providing an electronic database 130 in communication with the retailer computing device 115 and carrier computing device 185 over the communication network 120 (step 920).

The exemplary method 900 illustrated in FIG. 9 further includes providing a first graphical interface 125 accessible on the retailer computing device 115 by the carriers 180 via their respective computing devices 185 and configured to permit the carriers 180, via their respective computing devices 185, to submit reimbursement requests based on supplier-associated delays experienced by the carriers 180 (step 930). Portions of an exemplary first graphical interfaces 325, 425, and 525 are illustrated in FIGS. 3, 4, and 5, respectively, and have been discussed in more detail above. In one aspect, after the detention reimbursement request is submitted by a supplier 170 via the first graphical interface 125, an operator of the retailer computing device 115 is permitted to review the electronic information submitted by the supplier 170 in order to verify the detention reimbursement submission-associated information entered by the supplier 170 and to confirm that this information is valid, verifiable, and/or correctable. To that end, the method 900 of FIG. 9 further includes permitting an operator of the retailer computing device 115 to browse through the listing of the reimbursement requests in the second graphical interface 145 and to select from the listing a reimbursement request submitted by a carrier 180 against a supplier 170 to be forwarded to the supplier 170 for review (step 950). Portions of sample second graphical interfaces 635, 735 are illustrated in FIGS. 6 and 7.

In some aspects, if the information submitted by the carrier 180 in support of the detention reimbursement request is found to be not valid by the operator of the retailer computing device 115, the control circuit 210 of the retailer computing device 115 is programmed to generate and transmit to the carrier 180 over the network 120 a template electronic notification of denial of the reimbursement request. In other aspects, if the information submitted by the carrier 180 in support of the detention reimbursement request is found to be valid by the operator of the retailer computing device 115, the control circuit 210 of the retailer computing device 115 is programmed to generate and transmit a template electronic notification alert to the supplier 170 to inform the supplier 170 that a detention reimbursement request has been submitted by the carrier 180 against the supplier 170.

After a reimbursement request submitted by the carrier 180 is selected by the operator of the retailer computing device 115 from the listing of the reimbursement requests in the second graphical interface 145, the exemplary method 900 illustrated in FIG. 9 further includes transmitting from the retailer computing device 115 and over the communication network 120 an electronic alert notification to the computing device 175 of the supplier 170 against which the reimbursement request was submitted (step 960). As discussed above, if the supplier 170 does not respond to the electronic notification (e.g., template electronic mail generated at and sent from the retailer computing device 115) of a detention reimbursement request within a predetermined interval of time (e.g., 12 hours, 24 hours, 48 hours, 1 week, etc.), the control circuit 210 of the retailer computing device 115 is programmed to generate a notification at the retailer computing device 115 indicating that the supplier 170 has not yet responded to the initial alert transmitted from the retailer computing device 115 to the supplier computing device 175.

Following the receipt of this alert notification, the operator of the retailer computing device 115 is permitted to select, for example, within a drop-down menu in the first graphical interface 125 or the second graphical interface 145, a second template electronic mail notification to the supplier 170 indicating that a response by the supplier 170 to this electronic mail notification is urgent. In some embodiments, if the supplier 170 does not respond to the first or second electronic notification of a detention reimbursement request within the predetermined interval of time, the control circuit 210 of the retailer computing device 115 is programmed to generate and transmit one, two, or three more additional urgent electronic mail notifications to the supplier computing device 175 to notify the supplier 170 that a detention reimbursement request was filed by a carrier 180. In addition, one or more of such urgent electronic mail notifications can be configured to inform the carrier 180 that the detention reimbursement request will be automatically approved by the retailer computing device 115 if the carrier 180 fails to respond to the additional urgent electronic mail notifications within a predetermined interval of time.

In some embodiments, after the electronic notification of a detention reimbursement request is transmitted from the retailer computing device 115 over the network 120 to the supplier computing device 175, the supplier 170 responds to the notification by transmitting an electronic mail to the retailer computing device 115 including a time stamp indicating the time of arrival of the carrier 180 to the facility of the supplier 170 and a time stamp indicating the time of departure of the carrier 180 from the facility of the supplier 170. To that end, the method 900 includes receiving, at the retailer computing device 115, a transmission over the network 120 from the supplier computing device 175 indicating a response of the supplier 170 to the reimbursement request submitted by the carrier 180 against the supplier 170 (step 970). In one aspect, the exemplary method 900 includes generating a third graphical interface 155 including a plurality of input fields configured to permit the operator of the retailer computing device 115 to input at least the first time stamp and at least the second stamp provided by the supplier 170, after which the electronic data representing the time stamps provided by the supplier 170 can be transmitted by the retailer computing device 115 over the network 120 to the electronic database 130 for storage and/or retrieval by the control circuit 210 of the retailer computing device 115.

In some aspects, the first graphical interface 125 or second graphical interface 145 (or third graphical interface 155) generated by the retailer computing device 115 permits the operator of the retailer computing device 115 to approve a reimbursement request by clicking on a graphical element provided on a display 260 of the retailer computing device 115 and configured to approve or deny the reimbursement request. If the reimbursement request is approved at the retailer computing device 115, in the embodiment shown in FIG. 9, the method 900 further includes calculating, via the processor-based control circuit 210 of the retailer computing device 115, and based on the reimbursement request submitted by the carrier 180 and the response of the supplier 170, a reimbursement amount owed to the carrier 180 (step 980). Some exemplary approaches as to how the control circuit 210 of the retailer computing device 115 calculates a reimbursement amount due to the carrier 180 were discussed above.

After the reimbursement request of the carrier 180 against the supplier 170 is approved at the retailer computing device 115, the method 900 of FIG. 9 includes transmitting, from the retailer computing device 115 to the supplier computing device 175 and the carrier computing device 185, an electronic notification indicating whether the reimbursement request has been approved by the operator of the retailer computing device 115 (step 990). In one aspect, the method 900 includes transmitting an approval notification to the carrier computing device 185 over the network 120, and indicating, in the approval notification, that the reimbursement request of the carrier 180 has been approved, as well as the amount of the reimbursement owed to the carrier 180. In another aspect, the method 900 includes transmitting an approval notification to the supplier computing device 175 over the network 120, and indicating, in the approval notification, that the reimbursement request of the carrier 180 has been approved, and an amount billed to the supplier 170 to cover the reimbursement owed to the carrier 180.

The systems and methods described herein advantageously allow carriers to easily submit detention reimbursement requests against suppliers, provide carriers with the ability to respond to such requests, enable retailers to approve or deny the detention reimbursement requests, and calculate the reimbursement amounts owed. Such systems and methods provide carriers, retailers, and suppliers with significant time savings and associated operation cost reduction.

Those skilled in the art will recognize that a wide variety of other modifications, alterations, and combinations can also be made with respect to the above described embodiments without departing from the scope of the invention, and that such modifications, alterations, and combinations are to be viewed as being within the ambit of the inventive concept.

What is claimed is:

1. A system for facilitating reimbursement of carriers for supplier-associated delays during transportation of products by the carriers, the system comprising:
    a retailer computing device including a processor-based control circuit and a display, the retailer computing device being in communication with computing devices of the carriers over a communication network;
    an electronic database in communication with the retailer computing device and the computing devices of the carriers over the communication network;
    a first graphical interface accessible via the retailer computing device by the carriers on their respective computing devices, the first graphical interface including a plurality of modifiable input fields that permit the carriers, via their respective computing devices, to submit reimbursement requests based on supplier-associated delays experienced by the carriers;
    a second graphical interface accessible on the display of the retailer computing device by an operator of the retailer computing device and including a listing of the reimbursement requests submitted by the carriers via the first graphical interface, each of the reimbursement requests in the listing having a clickable graphical field associated therewith that permits the operator of the retailer computing device to select any one of the reimbursement requests;
    wherein the retailer computing device:
        generates the first graphical interface accessible via the retailer computing device by the carriers on their respective computing devices, wherein the first graphical interface permits the carriers, via their respective computing devices, to submit, via the modifiable input fields of the first graphical interface, reimbursement requests based on supplier-associated delays experienced by the carriers;
        generates the second graphical interface on the display of the retailer computing device
        permits the operator of the retailer computing device to browse through the listing of the reimbursement requests in the second graphical interface generated on the display of the retailer computing device and to click on a selected one of the clickable graphical fields associated with each one of the reimbursement requests in the listing displayed on the display of the retailer computing device in order to select from the listing a reimbursement request associated with the selected one of the clickable graphical fields and submitted by a carrier against a supplier to be forwarded to the supplier for review;
        transmits, over the communication network to a computing device of the supplier, an alert based on the reimbursement request selected by the operator from the listing to be forwarded to a supplier for review;
        receives a transmission over the communication network from the computing device of the supplier indicating a response of the supplier to the reimbursement request submitted by the carrier against the supplier;
        calculates, via the processor-based control circuit and based on the reimbursement request submitted by the carrier and based on the response of the supplier, a reimbursement amount owed to the carrier; and
        transmits, to at least one of the computing device of the carrier and the computing device of the supplier, a notification indicating whether the reimbursement request has been approved by the operator of the retailer computing device;
        displays a first drop-down menu including a first list of template electronic mails for the operator of the retailer computing device to select from and transmits, over the communication network to the computing device of the supplier, a template electronic mail selected by the operator from the drop-down menu; and
        generates a notification indicating that the supplier has not yet responded to the alert transmitted from the retailer computing device to the computing device of the supplier, and displays a second drop-down menu including a second list of template electronic mails for the operator of the retailer computing device to select from, and transmits, over the communication network to the computing device of the supplier, a template electronic mail selected by the operator from the second drop-down menu.

2. The system of claim 1, wherein the first graphical interface permits the carriers to submit their reimbursement requests into the modifiable input fields of the first graphical interface without logging into the retailer computing device.

3. The system of claim 1, wherein the retailer computing device displays the reimbursement requests submitted by the carriers to the operator to permit the operator to view and validate information submitted by the carriers in their respective reimbursement requests.

4. The system of claim 1, wherein the retailer computing device receives, from the computing device of the supplier and over the communication network, a first time stamp indicating a time when the carrier arrived at a facility of the supplier and a second time stamp indicating a time when the carrier departed from the facility of the supplier.

5. The system of claim 4, wherein the retailer computing device generates a third graphical interface including a plurality of input fields that permit the operator of the retailer computing device to input at least the first time stamp and at least the second stamp provided by the supplier.

6. The system of claim 1, wherein the retailer computing device permits the operator of the retailer computing device to approve a reimbursement request in the listing of the reimbursement requests in the second graphical interface by clicking on a graphical element that executes approval or denial the reimbursement request.

7. The system of claim 1, wherein the retailer computing device transmits an approval notification to the computing device of the carrier over the communication network, the approval notification indicating that the reimbursement request of the carrier has been approved and the amount of the reimbursement owed to the carrier.

8. The system of claim 1, wherein the retailer computing device transmits an approval notification to the computing device of the supplier over the communication network, the approval notification indicating that the reimbursement request of the carrier has been approved and an amount billed to the supplier to cover the reimbursement owed to the carrier.

* * * * *